(No Model.) 2 Sheets—Sheet 2.
J. B. ADAMS, Jr.
CORN PLANTER.
No. 463,931. Patented Nov. 24, 1891.
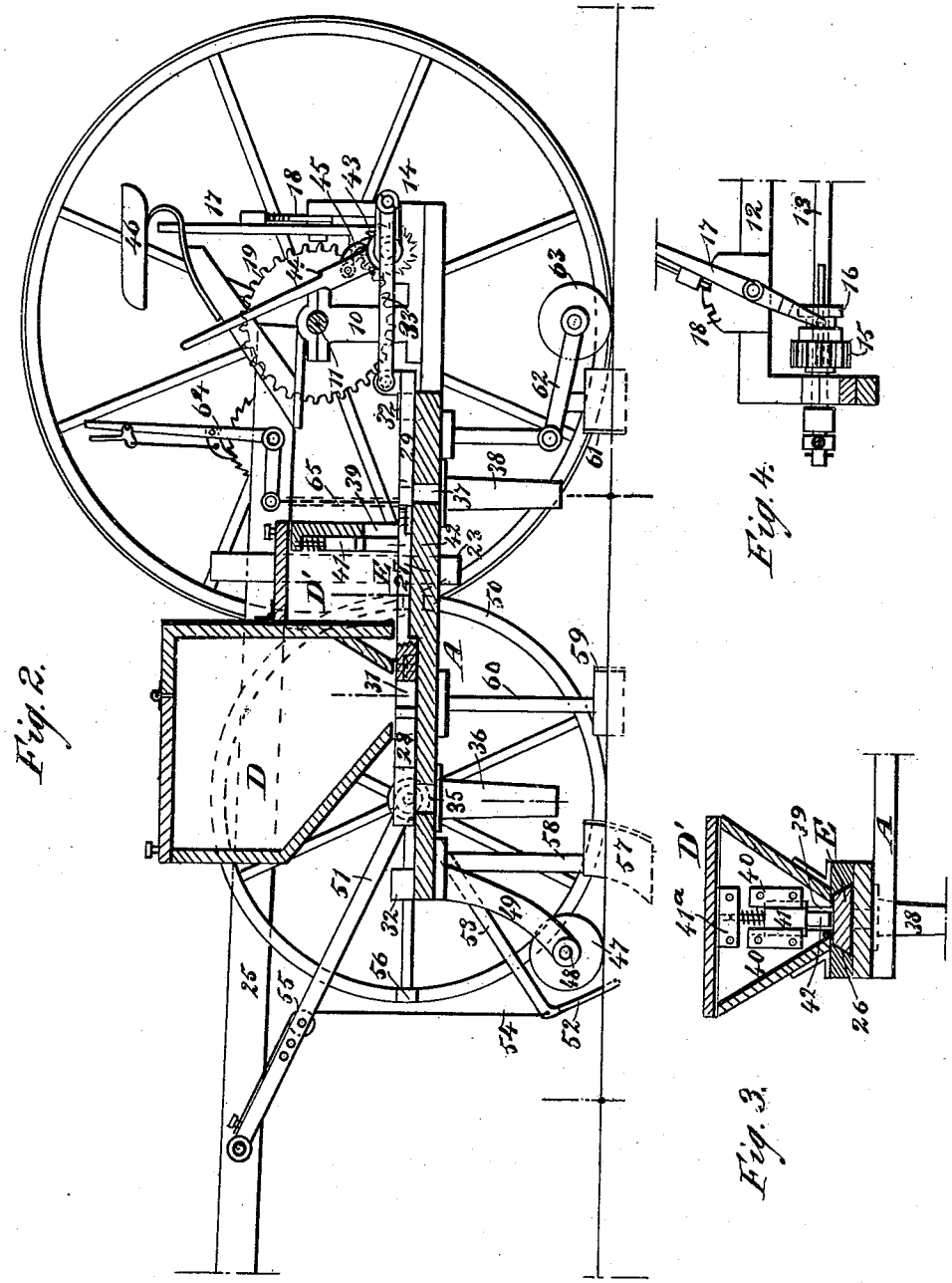
WITNESSES:
Dom Twitchell
C. Sedgwick
INVENTOR:
J. B. Adams Jr.
BY Munn & Co.
ATTORNEYS

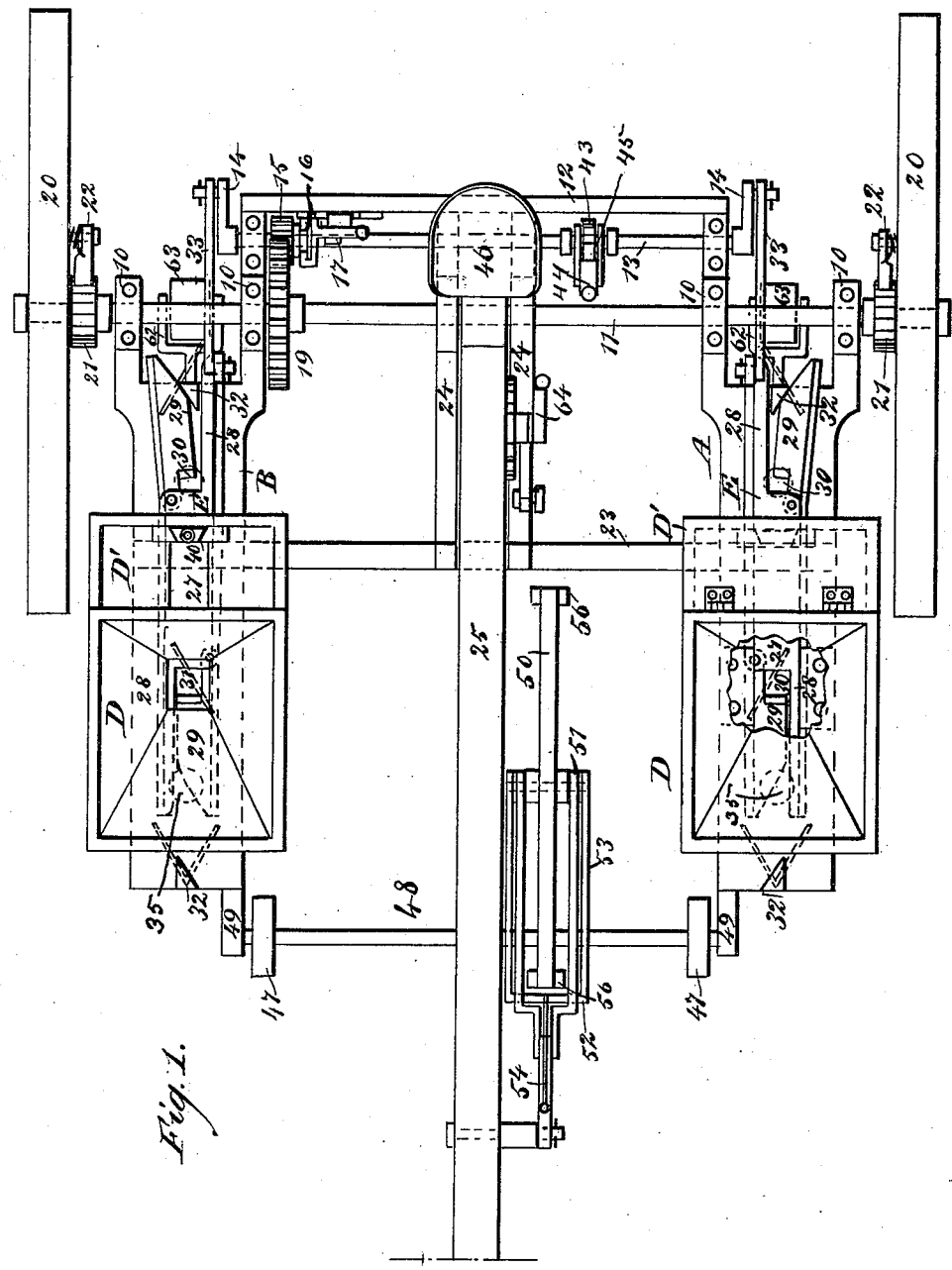

UNITED STATES PATENT OFFICE.

JOHN B. ADAMS, JR., OF MALDEN, NEW YORK.

CORN-PLANTER.

SPECIFICATION forming part of Letters Patent No. 463,931, dated November 24, 1891.

Application filed April 11, 1891. Serial No. 388,487. (No model.)

*To all whom it may concern:*

Be it known that I, JOHN B. ADAMS, Jr., of Malden, in the county of Ulster and State of New York, have invented a new and useful Improvement in Corn-Planters, of which the following is a full, clear, and exact description.

My invention relates to an improvement in corn-planters, and has for its object to provide a planter whereby corn may be planted in hills, and also whereby a fertilizer may be deposited in the hills previous to dropping the corn, the mechanism regulating the supply of fertilizer and seed acting in conjunction.

Another object of the invention is to provide a means whereby fertilizing material will be delivered and partially covered before the seed is dropped in the hill, and wherein also the seed will be effectually covered and the ground pressed down properly upon it.

The object of the invention also is to provide a means whereby the planter may be converted into a check-row planter, and to that end a check attachment of a simple and effective construction is connected with the implement.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a partial longitudinal section and partial side elevation of the implement, the section being taken through the boxes adapted to contain the seed and fertilizing material, and also through a platform supporting the same. Fig. 3 is a vertical section through one of the seed-boxes, and Fig. 4 is a detail view illustrating the shifting mechanism of the drive-shaft.

Two platforms A and B are provided at their rear ends with attached vertical standards 10, which standards are provided with boxes at their upper ends, and in the boxes the axle 11 of the implement is journaled. The rear ends of the platforms are preferably bifurcated, and a standard 10 is erected upon the upper face of each member, as shown in Fig. 1, and the inner standards of the platforms are connected by a rail or rails 12. The inner standards 10 are provided with two journal-boxes, the rear box being much lower than the forward one, in which the axle is journaled, and in the rear boxes the extremities of a drive-shaft 13 are journaled, provided at its extremities with crank-arms 14. The drive-shaft has splined thereon, near one end, a pinion 15, provided with a clutch-collar 16, as shown in Fig. 4, the collar being engaged by the lower forked end of a lever 17, fulcrumed upon one of the back rails 12, and the lever 17 is provided with the usual form of thumb-latch engaging with a suitable rack 18, as is likewise shown in Fig. 4. By means of the lever 17 the pinion 15 is thrown into and out of mesh with a gear 19, fast upon the axle, and through the medium of the gear 19 the axle, when revolved, imparts a similar movement to the drive-shaft. The axle is revolved through the medium of large rear supporting-wheels 20 loosely mounted upon its extremities, and the hubs of the wheels are preferably provided with ratchet-surfaces 21, engaged by spring-pressed dogs 22, said dogs being preferably pivoted upon the wheels, as shown in Fig. 1. When the dogs are in engagement with the ratchet-surfaces and while the implement is being drawn forward, the wheels 20 cause the axles 11 to revolve. If the dogs are thrown out of engagement with the ratchet-surfaces of the wheels, said wheels revolve loosely upon the axle; or the axle may be revolved without revolving the drive-shaft by carrying the pinion 15 out of mesh with the gear 19.

The two platforms A and B are connected at or near their central portions preferably by means of a cross-beam 23, and a longitudinal frame 24 is erected at each side of the center of the implement, extending, preferably, from the cross-beam 23 to the back rails 12. The tongue or pole 25 is located between the frames 24, and the inner extremity of the tongue or pole is so constructed as to loosely embrace the axle 11, as shown in Fig. 2.

Upon each platform A and B two boxes D and D' are mounted. The forward boxes D are larger than the rear ones, the forward boxes being adapted to contain the fertilizing material and the rear boxes D' the seed to be planted. The sides of the boxes are inclined at the bottom, and each box is provided with a suitable cover. In the front and rear faces of both boxes of each platform longitudinal openings are made, and similar openings are also produced in the partition dividing the two boxes, as shown in Fig. 2. These openings are adapted for the reception of seed-drop slides E, the said slides being adapted to travel in essentially dovetail ways 26, one of which is illustrated in Fig. 3. The openings in the ends of the boxes and in the central partition correspond in shape to that of the slideways, and the seed-drop slides have their sides beveled from the top downward in opposite directions, as is likewise best shown in Fig. 3. The fertilizing material and likewise the seed in the boxes rest at all times upon the upper surfaces of the drop-slides. The seed-drop slides are of peculiar construction and embrace a body-section 27, provided with much narrower extension-sections 28, one being located at each end of the body-section and at opposite sides, as illustrated in Fig. 1, thus providing recesses which are adapted for the reception of pivot-sections 29, the said sections being attached by means of a hinge or pivot to the shoulder portions of the body-section 27. The pivot-sections 29 when closely engaged with the extension-sections 28 of the body of the slide equal in width that of the body, and at the junction of the pivot-sections with the body-sections openings 30 and 31 are made, said openings being produced in the inner contiguous edges of the sections. Two openings only are produced in each drop-slide, one being adapted to receive fertilizing material and the other corn, as in the operation of the slide said openings constitute pockets. The outer ends of the pivot-sections of the drop-slides are beveled and the beveled surfaces engage with beveled blocks 32, located upon the platforms A and B, one at or near each end and in the paths of the slides. The rear extension section or member 28 of each drop-slide is connected to one of the crank-arms 14 of the drive-shaft 13 through the medium of a rod or pitman 33. Thus as the shaft 13 is revolved a laterally-reciprocating motion is imparted to the drop-slides. In front of the forward boxes D, containing the fertilizing material, an opening 35 is produced in the platforms, and the openings are surrounded by chutes 36, secured to the lower faces of the platforms and extending vertically downward. Similar openings 37 are likewise produced in the platforms at the rear of the seed-boxes, and these openings are also surrounded by chutes 38, attached to the platforms and extending downward, as is best shown in Fig. 2. The openings 35 of the platforms are adapted for registry with the openings 31 in the seed-drop slides, at which time the fertilizing material within the openings 31 falls therefrom to the ground through the chute 36, and the openings 30 in the seed-drop slides are adapted for engagement with the platform-openings 37 and deliver the seed to the ground through the chutes 38. When one opening of the drop-slide is discharging the other opening is receiving.

In order to prevent the seed-boxes from becoming strained by reason of the slide-openings 30 containing more seed than they should carry, I have provided a device which I denominate a "governor," the said device being adapted to regulate the amount of seed to be carried from a box, and to that end above the openings in the boxes through which the drop-slides pass a second and connecting opening 39 is made, as shown in Figs. 2 and 3. Upon the inner front faces of each seed-box slide-ways 40 are constructed, in which a spring-pressed block 41 is held to travel, the rod attached to the block around which the spring is coiled being adapted to enter and move in a socket-plate $41^a$, located near the top of the seed-boxes. The lower end of the block 41 has attached thereto a spring-plate 42, which extends downward and is normally in engagement with the upper surface of the drop-slide. Thus as the slide is carried rearward to discharge seed from the box the spring-plate 42 levels the seed in the pocket-opening of the slide, and if by chance a seed should so extend above the surface of the slide as to exert too much tension upon the plate 42 the plate is enabled to move upward and permit the obstruction to pass and is thrown downward again by the spring-pressed block 41.

The seed and fertilizing material may be delivered from the boxes by hand, when desired, and this is accomplished by securing a ratchet-wheel 43 upon the drive-shaft 13 and loosely mounting upon the shaft adjacent to the wheel a lever 44, provided with a dog 45, engaging with the ratchet. By the manipulation of the lever 44 the shaft 13 may be revolved, and thus communicate movement to the drop-slides. The shifting-lever 17 and the lever 44 are both convenient to the driver's seat 46, which is preferably supported upon the rear end of the tongue or pole. The forward end of the planter is supported through the medium of small wheels 47, which are mounted upon a shaft 48, journaled in hangers 49, projected downwardly and forwardly from the forward ends of the platforms A and B.

If corn is to be planted in rows, there need be no particular place for starting; but if it is to be planted in hills the hills should be in straight rows, so that they can be cultivated in both ways, and it is not possible to accomplish this result without having a check-row or guide of some kind. I provide a marker whereby the larger part of a field may be laid out in the form of a square or an oblong, the length of which is exactly divisible by the distance between two hills. This is accomplished by providing a wheel 50 about six feet in circumference or of a circumference equal to the distance between two hills. This wheel is journaled in a bifurcated arm 51, which arm is pivotally and adjustably attached to any convenient point upon the frame of the implement, preferably at one side of the tongue, as shown in Figs. 1 and 2, and in front of the wheel a drag 52 is located engaging with the ground, the said drag being provided with arms 53, also pivoted to the bifurcated arm 51. The drag may be raised or lowered by attaching to it a rope or chain 54, and passing the same upward over a roller 55 in the bifurcated arm to an attachment with said arm near its upper end. The wheel 50 revolves once for every two hills, or makes a half-revolution for every hill planted, and two markers 56 are placed upon the periphery of the wheel at equidistance apart, one marker being adapted to represent three feet or a hill. Plows 57 throw up the ground and create furrows for the reception of the fertilizing material, which plows are located upon standards 58, secured to the platforms. At the rear of the funnels or chutes 36 cover-blades 59 are diagonally located beneath the platform and secured to said platform by suitable standards 60. The cover-blades 59 are adapted to throw earth over the fertilizing material after it has been placed in the furrows. At the rear of the rear funnels or chutes 38, which deliver the corn, cover-blades 61 are located, extending diagonally beneath the platforms, but in a direction opposite to the forward cover-blades. The rear cover-blades 61 are attached, preferably, to horizontal arms 62, which arms are connected with the platforms, and carry at their rear ends rollers 63.

In operation as the implement is drawn forward a furrow is created, and by the revolution of the drive-shaft 13 the drop-slides are reciprocated and fertilizing material will be delivered into the furrow while seed is entering the pocket of the slide. After the implement has been carried forward, say, the distance of three feet, which would be the space between hills, the fertilizer-distributing funnels will be in position to again drop fertilizing material for another hill; but the gearing connecting the axle and the drive-shafts are so calculated that at the moment the seed-chutes 38 arrive at the hill formed by the deposit of the fertilizing material the seed-pockets in the drop-slides will deliver seed to the hills and the fertilizer-pocket in the drop-slide will be within the fertilizer-box, receiving another charge. Thus the fertilizing material and the seed are delivered alternately to the ground, and while the drop-slides are receiving corn they are discharging fertilizing material. The discharge of corn is not effected until the chutes 38 are immediately over the hills. When it is desired to plant the corn in regular rows, the marking implement is applied, and each time one of the marking-blocks is brought uppermost upon the wheel it indicates that seeds have at that time been planted in a hill, so that a driver by counting the number of times the block appears at the top of the marking-wheel will know exactly how many hills have been planted upon a given line. With this information, when one row has been planted, a line having been defined by the drag 52 at a right angle to that finished, the implement is turned and the drop-slides manipulated, so that the first drop will be from the fertilizing-boxes, and the implement is driven forward until a number of hills have been planted corresponding to the number of hills in the first row, and in this way the rows will tally in all directions and may be readily cultivated. After the seeds have been dropped in the hill the cover-blade 61 covers them with earth and the earth is pressed down by the roller 63 following.

I desire it to be understood that the implement may be used with but a single set of boxes, in which event it may be drawn by a single horse. The implement illustrated in the drawings is a double one and plants and fertilizes two hills at once, being adapted to be drawn by a team.

An angle-lever 64 is pivoted upon the pole or tongue provided with a thumb-latch engaging with a suitable rack, which angle-lever is connected by a chain 65 or the equivalent thereof, with the cross-bar 23 of the frame, the object of the lever being to facilitate hoisting the front of the machine, so that the forward wheels will not interfere with the action of the implement when it is desired to turn corners. It is evident from the construction of the seed-drop slide illustrated that the corn or the fertilizer will not stick or remain fast to the walls of the pockets 30 and 31, as the moment the pocket arrives over the delivery-aperture in the platform the pivotal section is engaged by one of the blocks 32 and is forced away from the rigid section, thus materially increasing the diameter of the pocket and effectually loosening the contents thereof.

Having thus described my invention, I claim as new and desire to secure by Letters Patent—

1. In a corn-planter, the combination, with an axle, a drive-shaft provided with crank-arms and a gear connection, substantially as described, between the axle and the drive-shaft, of a seed-box having a slideway in its under surface and a seed-drop slide held to travel in said slideway, comprising pivoted sections having a pocket or opening at their connecting ends, a pitman connection between the seed-drop slide and the crank of the drive-shaft, and a stationary block adapted to engage with one of the sections of the seed-drop slide, as and for the purpose specified.

2. In a planter, the combination, with a seed-box and a reciprocating seed-slide therein and provided with seed-receiving pocket, of slideways secured upon the inner face of the seed-box, a socket-plate at the top of the said box, a block, a rod attached to the block and projecting into the socket, a spring surrounding the rod between the socket and block, and a spring-plate secured to the lower end of the block, substantially as described.

3. The combination, with an axle and a drive-shaft driven from the axle, substantially as described, of a platform provided with an opening or openings therein, a box adapted to contain fertilizing material, and a seed-box also supported by the platform, the said boxes having slideways produced in their bottom surfaces, a seed-drop slide held to travel in the slideways of both boxes, comprising rigid sections and pivoted sections at the ends of the rigid sections, the said drop-slide being provided with openings corresponding in number to the openings in the platform and adapted to register therewith, a pitman connection between the seed-drop slide and the drive-shaft, and spacing-blocks located to engage with the extremities of the pivoted sections of the seed-drop slides, as and for the purpose specified.

4. In a planter, the combination, with the frame, of a bifurcated arm pivoted to the forward part of the frame and projecting rearwardly, a marker-wheel mounted in the bifurcated arm, and a drag in front of the marker-wheel and provided with arms pivoted to the bifurcated arm, substantially as described.

5. In a planter, the combination, with the frame and an arm pivoted to the forward part of the frame and having its free end bifurcated, of a marker-wheel mounted in the bifurcated end of the arm, a second arm pivoted to the first-named arm, a drag on the second arm, and a rope or chain secured to the drag-arm and passed up over a roller on the bifurcated arm, substantially as and for the purpose set forth.

6. In a planter, the combination, with a pivoted bifurcated arm, of a marker-wheel mounted in the free end of the said arm, an arm pivoted to the bifurcated arm, a drag on said arm, and a rope or chain secured to the drag-arm and passed up over a roller in the bifurcated arm, substantially as herein shown and described.

JOHN B. ADAMS, JR.

Witnesses:
HERBERT M. HOVER,
CHAS. KNOX.